W. Twitchell,
Gate Pulley.
Nº 6,632. Patented Aug. 7, 1849.
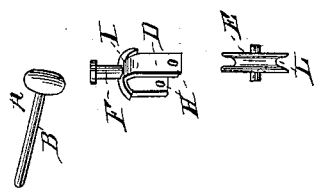
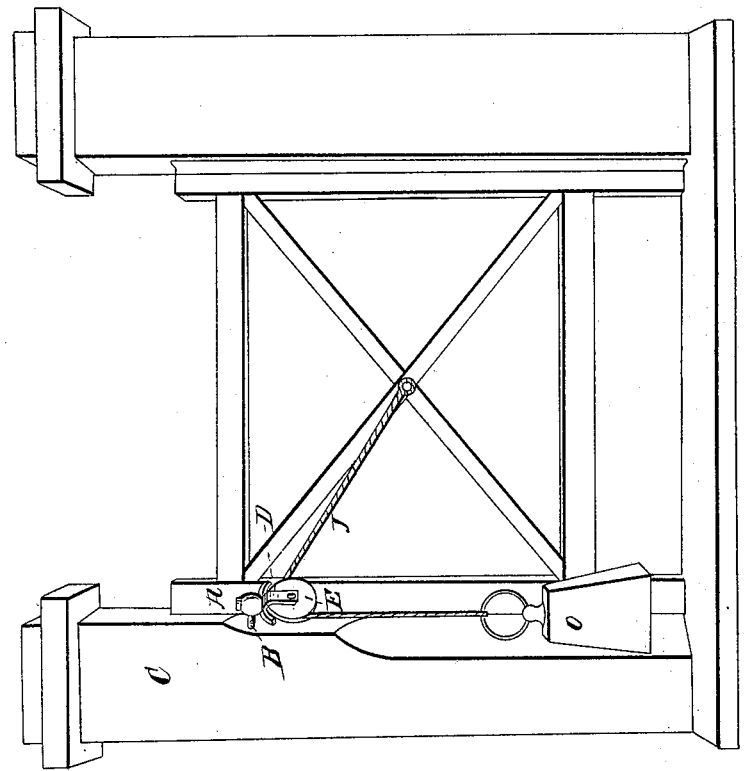

UNITED STATES PATENT OFFICE.

WILLARD TWITCHELL, OF SYRACUSE, NEW YORK.

ARRANGEMENT OF WEIGHT AND PULLEY FOR CLOSING GATES.

Specification of Letters Patent No. 6,632, dated August 7, 1849.

*To all whom it may concern:*

Be it known that I, WILLARD TWITCHELL, of Syracuse, New York, have invented a new and useful Improvement in Devices for Closing Doors and Gates; and I do hereby declare the following to be a full, clear, and exact description of the construction and operation of the same, reference being had to the annexed drawings, making part of this specification.

To enable others skilled in the art to make and use my invention I will proceed to describe its construction and operation.

The nature of my invention consists in so attaching a pulley to the post of the gate, that its position will change with the change in the direction of the cord, as the gate is opened or closed, thereby enabling me to get the full effect of the weight with a single pulley.

Construct a support (A) having a shank (B) made in the usual manner to be driven into the post (C), and similar to the eye of a wrought iron hinge, that is having a perpendicular hole through its head. Make a yoke, or bearer (D) for the pulley (E), having a shaft (F) projecting upward corresponding in size, to the hole in the head of the support (A), and having an arm (H) projecting downward upon each side of the pulley (E). At the lower end of each arm is a hole drilled to receive the shaft of the pulley. At the upper end of the arms (H) are guards (I) to prevent the cord (J) drawing out of the groove of the pulley. The depth of the groove (L) in the pulley should be made about twice the diameter of the cord (J), and the diameter of the pulley should be about two and a half inches. Drive the shank (B) firmly into the post, pass the shaft of the yoke through its head from below upward, and secure it firmly in its place by a nut, or pin, at the upper end, the pulley having been previously attached to the yoke. Pass the cord (J) over the pulley, attach one end to the gate, and the other to a weight (O). It is obvious that as the gate is opened, the weight will be raised, to a greater or less extent according to the point of attachment to the gate, and also that the pulley will be turned by the cord, also the yoke, thereby keeping the pulley in the direction in which the cord is drawing.

The object gained by the joint over the pulley, is, that the draft of the cord may turn the yoke which supports the pulley, and thereby do away with the necessity of a second pulley to change the direction of the cord.

By using a single pulley, made adjustable as above described, in combination with a weight, I am enabled to attach the cord to the gate at a point below the level of the pulley. Then by securing an upward draft on the gate, which counteracts its tendency to settle. This effect, viz, an upward draft on the gate, cannot be obtained by fixed pulleys.

Heretofore weights used in closing gates, have either tended to drag the gate downward, or at least, have had no tendency to prevent them settling.

What I claim as my invention, and desire to secure by Letters Patent, is—

The application of a swivel pulley for closing a gate when the cord, to which the weight is attached, is fastened to the gate below the level of the said pulley whereby it acts not only as a gate closer, but also as a support to prevent the gate from sagging, the whole constructed substantially as herein described.

WILLARD TWITCHELL.

Witnesses:
A. JUDSON,
R. F. STEVENS.